(12) United States Patent
Nagl et al.

(10) Patent No.: US 11,948,269 B2
(45) Date of Patent: Apr. 2, 2024

(54) SYSTEMS, METHODS, AND STORAGE MEDIA FOR AUTOMATICALLY SIZING ONE OR MORE DIGITAL ASSETS IN A DISPLAY RENDERED ON A COMPUTING DEVICE

(71) Applicant: CBS Interactive Inc., San Francisco, CA (US)

(72) Inventors: Alexander Nagl, San Francisco, CA (US); Marine Hamersma, San Francisco, CA (US); Ogo Batzorig, San Francisco, CA (US); Vida Escandar, San Francisco, CA (US); Terry Song, San Francisco, CA (US); Steven Kean, San Francisco, CA (US); Kristine Blukis, San Francisco, CA (US); Chaitra Urs, San Francisco, CA (US)

(73) Assignee: CBS Interactive Inc., San Francisco, CA (US)

( * ) Notice: Subject to any disclaimer, the term of this patent is extended or adjusted under 35 U.S.C. 154(b) by 49 days.

(21) Appl. No.: 17/711,669

(22) Filed: Apr. 1, 2022

(65) Prior Publication Data
US 2023/0316452 A1    Oct. 5, 2023

(51) Int. Cl.
*G06T 3/40*    (2006.01)

(52) U.S. Cl.
CPC ...................... *G06T 3/40* (2013.01)

(58) Field of Classification Search
CPC ........................................ G06T 3/40
See application file for complete search history.

(56) References Cited

U.S. PATENT DOCUMENTS

| | | | |
|---|---|---|---|
| 7,015,960 B2* | 3/2006 | Tay ...................... | H04N 25/63 348/250 |
| 7,952,579 B1* | 5/2011 | Greene ................. | G06T 15/405 345/422 |
| 2008/0111823 A1* | 5/2008 | Fan ....................... | G06T 3/4092 345/531 |

* cited by examiner

*Primary Examiner* — Phi Hoang
(74) *Attorney, Agent, or Firm* — Rimon PC; Marc S. Kaufman (57) ABSTRACT

Systems, methods, and storage media for automatically sizing one or more digital assets in a display rendered on a computing device are disclosed. Exemplary implementations may: select examples of digital assets to be displayed; create a set of training data structures; each train data structure including an aspect ratio of each digital asset and the predetermined height or width corresponding to the aspect ratio for that digital asset; perform polynomial regression analysis on the set of training data to determine a best fitted trend line and a corresponding polynomial equation; and apply the polynomial equation to at least one specific digital asset data structure to be displayed to thereby automatically calculate a size of the at least one specific digital asset as displayed.

12 Claims, 6 Drawing Sheets

| Width | Height | Aspect Ratio | Computed Height | Digital Asset Title |
|---|---|---|---|---|
| 140 | 150 | 1.071428571 | 150 | |
| 204 | 150 | 0.735294118 | 150 | |
| 600 | 54 | 0.09 | 55 | |
| 430 | 82 | 0.190697674 | 80 | |
| 338 | 100 | 0.295857988 | 102 | |
| 258 | 65 | 0.251937984 | 93 | |
| 1024 | 85 | 0.083007813 | 53 | |
| 477 | 107 | 0.224318658 | 87 | |
| 233 | 269 | 1.154506438 | 146 | Paw Patrol |
| 792 | 200 | 0.252525253 | 93 | |
| 488 | 108 | 0.221311475 | 87 | |
| 542 | 122 | 0.225092251 | 87 | |
| 1024 | 85 | 0.083007813 | 53 | |
| 352 | 101 | 0.286931818 | 100 | CBS |
| 120 | 120 | 1 | 152 | |
| 245 | 189 | 0.771428571 | 151 | Adams Family |
| 598 | 121 | 0.202341137 | 82 | America Hidden Stories |
| 303 | 116 | 0.382838284 | 116 | Sponge Bob |
| 406 | 198 | 0.487684729 | 130 | Younger |

SYSTEMS, METHODS, AND STORAGE MEDIA FOR AUTOMATICALLY SIZING ONE OR MORE DIGITAL ASSETS IN A DISPLAY RENDERED ON A COMPUTING DEVICE

FIELD OF THE DISCLOSURE

The present disclosure relates to systems, methods, and storage media for automatically sizing one or more digital assets in a display, such as a user interface, rendered on a computing device.

BACKGROUND

Various digital assets, such as logos and other images, are often displayed on web pages (i.e., rendered by a browser) or within various other applications. Certain assets, such as logos are re-used many times and displayed in many different applications in accordance with a layout defined for the application. For example, a user interface for selecting a movie stream from a Content Delivery Network (CDN) will often include a graphic from the movie, user interface selection components (e.g., a Play button) along with one or more logos or other branding. Often, when providing a menu of movie selections for example, multiple logos, each corresponding to a different movie or other content, are displayed in a single web page or other user interface. Selection of a logos in the user interface serves to select content relating to the logo.

The various logos may be of different aspect ratios and sizes. Depending on the layout for the specific user interface or other display, it is often desirable to change the size of a logo or other digital asset for aesthetic reasons. Further, when the digital assets are presented in a user interface, inconsistent prominence of the various assets can cause user confusion or unduly influence the user selection of options. To ensure that such assets render in an aesthetic and consistent manner within various layouts, it is known to manually size each digital asset within a container by adding "padding", i.e., a layer of pixels with a color value of zero color value (i.e., transparent pixels), around the edges of the image in the corresponding image file. This manual process is tedious and results in unique challenges in layout design that are not suited to automation.

As an example, applicant has found that it takes 3 person hours to prepare the various containers for a single movie logo for each layout that they use. A streaming service typically may have 500 to 1000 movies that are currently being streamed. Therefore, the time to pad and package the logos for all current movie is anywhere from 1500 (3×500) to 3000 (3×1000) person hours. This amounts to roughly 180 to 360 working days for a single person. It can be seen that the labor required for preparing repeatable digital assets for even a moderate collection of digital assets can be extensive.

SUMMARY

Applicants have developed an innovative process for leveraging polynomial regression analysis to provide automated sizing of digital assets to achieve esthetically pleasing layouts. The layouts can be used to create user interfaces that provide more efficient use of networked computing devices, such as content distribution networks (CDN).

One aspect of the present disclosure relates to a system configured for automatically sizing one or more digital assets in a display rendered on a computing device. The system may include one or more hardware processors configured by machine-readable instructions. The processor(s) may be configured to select examples of digital assets to be displayed. The processor(s) may be configured to adjust the size the example digital assets to correspond to one of a predetermined height or width which achieves stylistic goals. The processor(s) may be configured to create a set of training data structures from the adjusted example digital assets, wherein each training data structure includes an aspect ratio of a corresponding digital asset and the predetermined height or width corresponding to the aspect ratio for that digital asset. The processor(s) may be configured to perform polynomial regression analysis on the set of training data structures to determine a best fitted trend line and a corresponding polynomial equation. The processor(s) may be configured to apply the polynomial equation to at least one specific digital asset data structure to be displayed to thereby automatically calculate a size of the at least one specific digital asset as displayed.

Another aspect of the present disclosure relates to a method for automatically sizing one or more digital assets in a display rendered on a computing device. The method may include selecting examples of digital assets to be displayed. The method may include adjusting the size the example digital assets to correspond to one of a predetermined height or width which achieves stylistic goals. The method may include creating a set of training data structures from the example digital assets, where each training data structure includes an aspect ratio of a corresponding digital asset and the predetermined height or width corresponding to the aspect ratio for that digital asset; The method may include performing polynomial regression analysis on the set of training data structures to determine a best fitted trend line and a corresponding polynomial equation. The method may include applying the polynomial equation to at least one specific digital asset data structure to be displayed to thereby automatically calculate a size of the at least one specific digital asset as displayed.

Yet another aspect of the present disclosure relates to a non-transient computer-readable storage medium having instructions embodied thereon, the instructions being executable by one or more processors to perform a method for automatically sizing one or more digital assets in a display rendered on a computing device. The method may include selecting examples of digital assets to be displayed. The method may include adjusting the size the example digital assets to correspond to one of a predetermined height or width which achieves stylistic goals. The method may include creating a set of training data structures, wherein each training data structure includes an aspect ratio of a corresponding digital asset and the predetermined height or width corresponding to the aspect ratio for that digital asset; The method may include performing polynomial regression analysis on the set of training data to determine a best fitted trend line and a corresponding polynomial equation. The method may include applying the polynomial equation to at least one specific digital asset data structure to be displayed to thereby automatically calculate a size of the at least one specific digital asset as displayed.

These and other features, and characteristics of the present technology, as well as the methods of operation and functions of the related elements of structure and the combination of parts and economies of manufacture, will become more apparent upon consideration of the following description and the appended Claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the Claims, the singular form of "a", "an", and "the" include plural referents unless the context clearly dictates otherwise.

DETAILED DESCRIPTION

Figure 1:
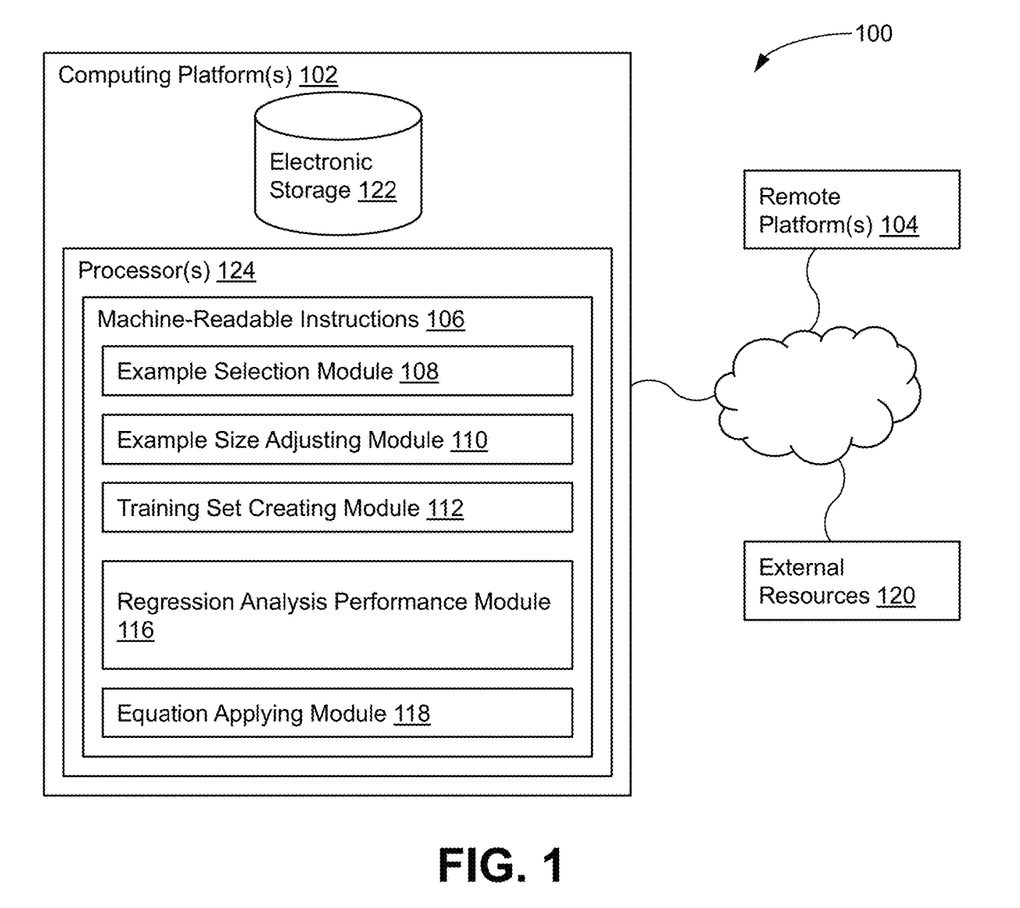
FIG. 1 illustrates a system configured for automatically sizing one or more digital assets in a display rendered on a computing device, in accordance with one or more implementations.

FIG. 1 illustrates a system 100 configured for automatically sizing one or more digital assets in a display rendered on a computing device, in accordance with one or more implementations. In some implementations, system 100 may include one or more servers 102. Server(s) 102 may be configured to communicate with one or more client computing platforms 104 according to a client/server architecture and/or other architectures. Accordingly, the term "client" as used herein does not necessarily mean that the device communicates in a client-server manner. Client computing platform(s) 104 may be configured to communicate with other client computing platforms via server(s) 102 and/or according to a peer-to-peer architecture and/or other architectures. Users may access system 100 via client computing platform(s) 104.

Server(s) 102 may be configured by machine-readable instructions 106. Machine-readable instructions 106 may include one or more instruction modules. The instruction modules may include computer program modules. The instruction modules may include one or more of example selection module 108, example size adjusting module 110, set creating module 112, aspect ratio training module 114, regression analysis performance module 116, equation applying module 118, and/or other instruction modules.

Example selection module 108 may be configured to select examples of digital assets that are potentially displayed in a computing system. Example size adjusting module 110 may be configured to adjust the size the examples of the digital assets to correspond to one of a predetermined height or width which achieves stylistic goals. Alternatively, this adjustment can be accomplished manually by applying known rules for presentation of images. For example, when a designer is creating an example asset, there could be a specific container size into which the assets should fit. For example, the container could be 300×500 pixels. The assets may need to be adjusted for the different containers. However, in many applications, the adjustment module and the related function will not be required. Set creating module 112 may be configured to create a set of training data structures based on the examples of the digital assets as adjusted. Each training data structure can include an aspect ratio of the corresponding digital asset as adjusted and the predetermined height and or width corresponding to the aspect ratio for that digital asset.

Regression analysis performance module 116 may be configured to perform polynomial regression analysis on the set of training data to determine a best fitted trend line and a corresponding polynomial equation. Equation applying module 118 may be configured to apply the polynomial equation to at least one specific digital asset data structure to be displayed to thereby automatically calculate a size of the at least one specific digital asset as rendered on a computer display, such as a user interface. The applying step may include determining the aspect ratio specified by the at least one specific digital asset data structure and inserting the aspect ratio into the polynomial equation to determine a size of the at least one specific digital asset as displayed. Alternatively, the applying step may include plotting multiple sets of points, including aspect ratio points and corresponding height points, along a curve generated by the polynomial equation and determining a best fit the at least one specific digital asset data structures with respect to the sets of points.

In some implementations, the one or more digital assets may be logos corresponding to digital content. In some implementations, there may be multiple specific digital asset data structures and the resulting display includes multiple corresponding digital assets displayed at an optically consistent size.

Server(s) 102, client computing platform(s) 104, and/or external resources 120 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, client computing platform(s) 104, and/or external resources 120 may be operatively linked via some other communication media.

A given client computing platform 104 may include one or more processors configured to execute computer program modules. The computer program modules may be configured to enable an expert or user associated with the given client computing platform 104 to interface with system 100 and/or external resources 120, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

External resources 120 may include sources of information outside of system 100, external entities participating with system 100, and/or other resources. In some implementations, some or all of the functionality attributed herein to external resources 120 may be provided by resources included in system 100.

Server(s) 102 may include electronic storage 122, one or more processors 124, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 122 may comprise non-transitory storage media that electronically stores information. The electronic storage media of electronic storage 122 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 122 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 122 may include one or more virtual storage resources (e.g., cloud storage, a virtual private network, and/or other virtual storage resources). Electronic storage 122 may store software algorithms, information determined by processor(s) 124, information received from server(s) 102, information received from client computing platform(s) 104, and/or other information that enables server(s) 102 to function as described herein.

Processor(s) 124 may be configured to provide information processing capabilities in server(s) 102. As such, processor(s) 124 may include one or more of a digital processor, an analog processor, a digital circuit designed to process information, an analog circuit designed to process information, a state machine, and/or other mechanisms for electronically processing information. Although processor(s) 124 is shown in FIG. 1 as a single entity, this is for illustrative purposes only. In some implementations, processor(s) 124 may include a plurality of processing units. These processing units may be physically located within the same device, or processor(s) 124 may represent processing functionality of a plurality of devices operating in coordination. Processor(s) 124 may be configured to execute modules 108, 110, 112, 116, and/or 118, and/or other modules. Processor(s) 124 may be configured to execute modules 108, 110, 112, 116, and/or 118, and/or other modules by software; hardware; firmware; some combination of software, hardware, and/or firmware; and/or other mechanisms for configuring processing capabilities on processor(s) 124. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 108, 110, 112, 116, and/or 118 are illustrated in FIG. 1 as being implemented within a single processing unit, in implementations in which processor(s) 124 includes multiple processing units, one or more of modules 108, 110, 112, 116, and/or 118 may be implemented remotely from the other modules. The description of the functionality provided by the different modules 108, 110, 112, 116, and/or 118 described below is for illustrative purposes, and is not intended to be limiting, as any of modules 108, 110, 112, 116, and/or 118 may provide more or less functionality than is described. For example, one or more of modules 108, 110, 112, 116, and/or 118 may be eliminated, and some or all of its functionality may be provided by other ones of modules 108, 110, 112, 116, and/or 118. As another example, processor(s) 124 may be configured to execute one or more additional modules that may perform some or all of the functionality attributed below to one of modules 108, 110, 112, 116, and/or 118.

Figure 2:
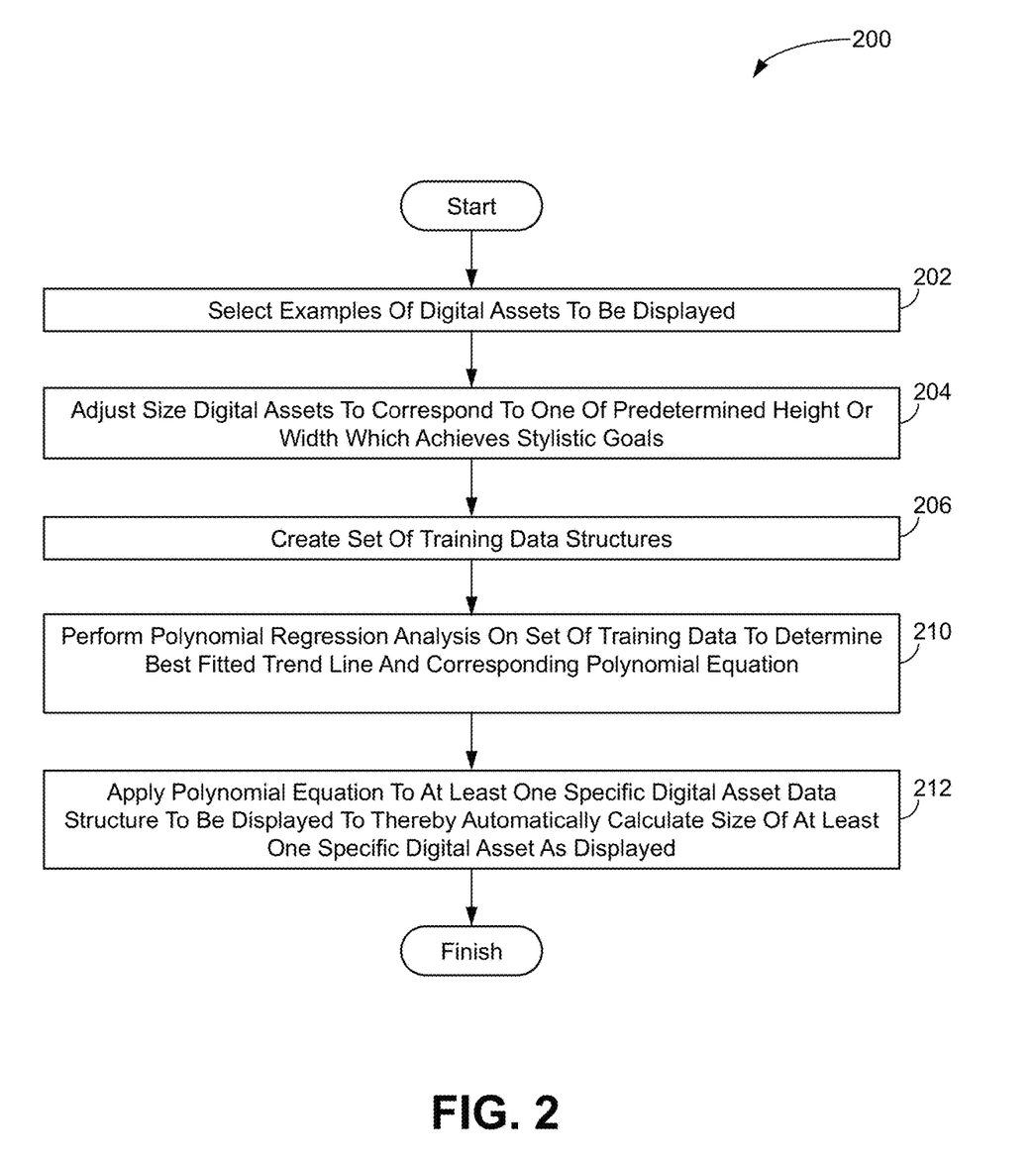
FIG. 2 illustrates a method for automatically sizing one or more digital assets in a display rendered on a computing device, in accordance with one or more implementations.

FIG. 2 is a flow chart illustrating a method 200 for automatically sizing one or more digital assets in a display rendered on a computing device, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200. For example, method 200 can be implemented by system 100 of FIG. 1.

An operation 202 may include selecting examples of digital assets to be displayed. Operation 202 may be performed by one or more hardware processors configured by machine-readable instructions including a module that is the same as or similar to example selection module 108, in accordance with one or more implementations.

An operation 204 may include adjusting the size the example digital assets to correspond to one of a predetermined height or width which achieves stylistic goals. Operation 204 may be performed by one or more hardware processors configured by machine-readable instructions including a module that is the same as or similar to example size adjusting module 110 or may be accomplished manually.

An operation 206 may include creating a set of training data structures. Operation 206 may be performed by one or more hardware processors configured by machine-readable instructions including a module that is the same as or similar to set creating module 112, in accordance with one or more implementations. Each training data structure can include an aspect ratio of each digital asset and the predetermined height or width corresponding to the aspect ratio for that digital asset.

An operation 210 may include performing polynomial regression analysis on the set of training data to determine a best fitted trend line and a corresponding polynomial equation. Operation 210 may be performed by one or more hardware processors configured by machine-readable instructions including a module that is the same as or similar to regression analysis performance module 116, in accordance with one or more implementations.

An operation 212 may include applying the polynomial equation to at least one specific digital asset data structure to be displayed to thereby automatically calculate a size of the at least one specific digital asset as displayed. Operation 212 may be performed by one or more hardware processors configured by machine-readable instructions including a module that is the same as or similar to equation applying module 118, in accordance with one or more implementations.

Figure 3:
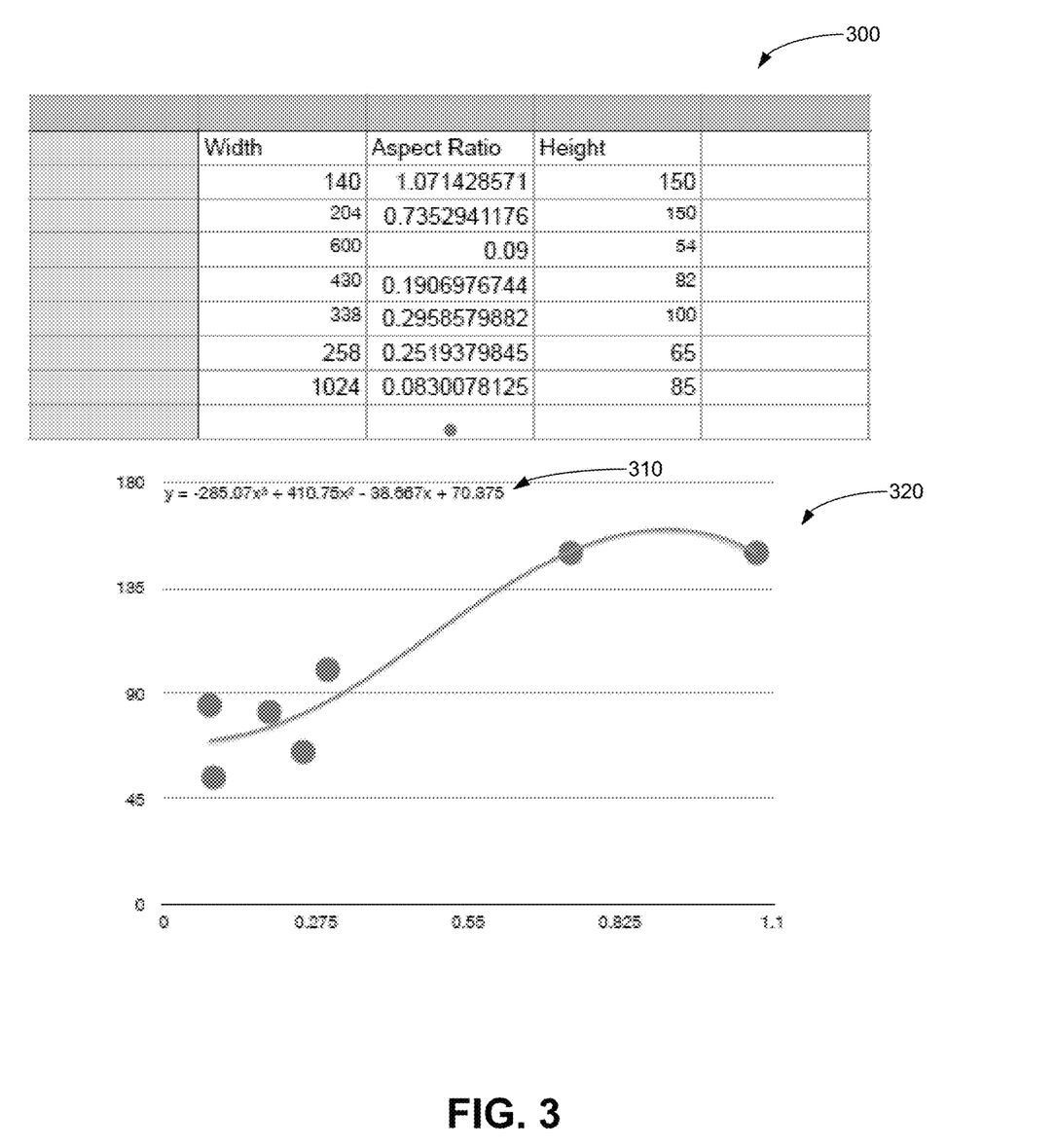
FIG. 3 illustrates training data and a resulting curve based on regression analysis, in accordance with disclosed implementations.

FIG. 3 illustrates an example of training data structures 300 (representing digital assets) that can be used to develop a sizing model based on polynomial regression analysis. Each row of data in FIG. 3 corresponds to a specific digital asset and includes parameters of the digital asset—Width, Height, and Aspect Ratio. The size of the example digital assets can be adjusted to correspond to one of a predetermined height or width to achieve stylistic goals. Once the size of any of the training examples has been adjusted, polynomial regression analysis is applied to the training data to obtain an equation for a curve that best fits the training data. Polynomial regression is a well-known mathematical technique. Polynomial regression is a form of linear regression where polynomial terms are added to a linear regression model to model a non-linear relationship between dependent and independent variables. For example, assuming that the input value is 35 and the degree of a polynomial is 2, 35 power 0, 35 power 1, and 35 power 2 is determined to interpret the non-linear relationship in data. The of polynomial equation can be expressed as:

$$y = a_0 + a_1 x_1 + a_2 x_1^2 + \cdots + a_n x_1^n.$$

Those of skill in the art of mathematics will understand how to apply polynomial regression in an effective manner to achieve the disclosed implementations based on the disclosure herein. Further, there are many off-the-shelf software tools for automatically applying polynomial regression to data sets.

At 310 in FIG. 3, we see the polynomial equation resulting from applying polynomial regression to the training data shown at 300. At 320, the curve resulting from mapping the equation is shown, with the training data plotted as x.y coordinates, where the x axis is aspect ratio, and the y axis is image display height. It can be seen that the polynomial equation fits the training data well.

Figure 4:
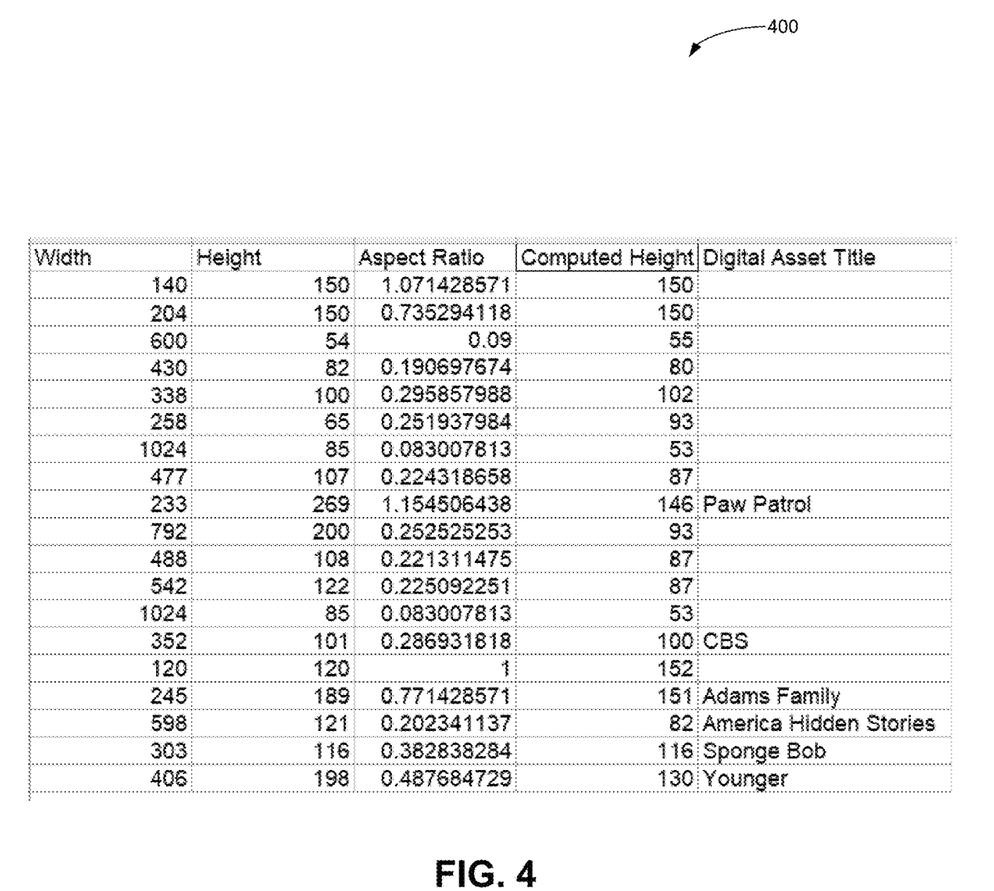
FIG. 4 illustrates a data structure showing calculations of height for various digital assets examples, in accordance with disclosed implementations.

FIG. 4 illustrates data structures, in table 400, calculated from the model developed above, i.e., the polynomial equation developed from the training data. The data structures of FIG. 4 correspond to digital assets and include a display height computed, using the polynomial equation, based on the width and aspect ratio of the digital asset. Some of the data structures include a digital asset title which is used herein to identify the digital asset for descriptive purposes in connection with FIGS. 5 and 6 below. Each original asset includes a width, a height, and an aspect ratio. The model of the disclosed implementations is applied to compute a display height ("computed height") that will result in an efficient layout and thus an efficient user interface. In some instances, such as the digital asset with the title "CBS", the computed height is very close to (or the same as) the original height. However, in other assets, such as the asset with the title "Younger", the height is adjusted substantially. This will become more apparent from the description of FIGS. 5 and 6 below.

Figure 5:
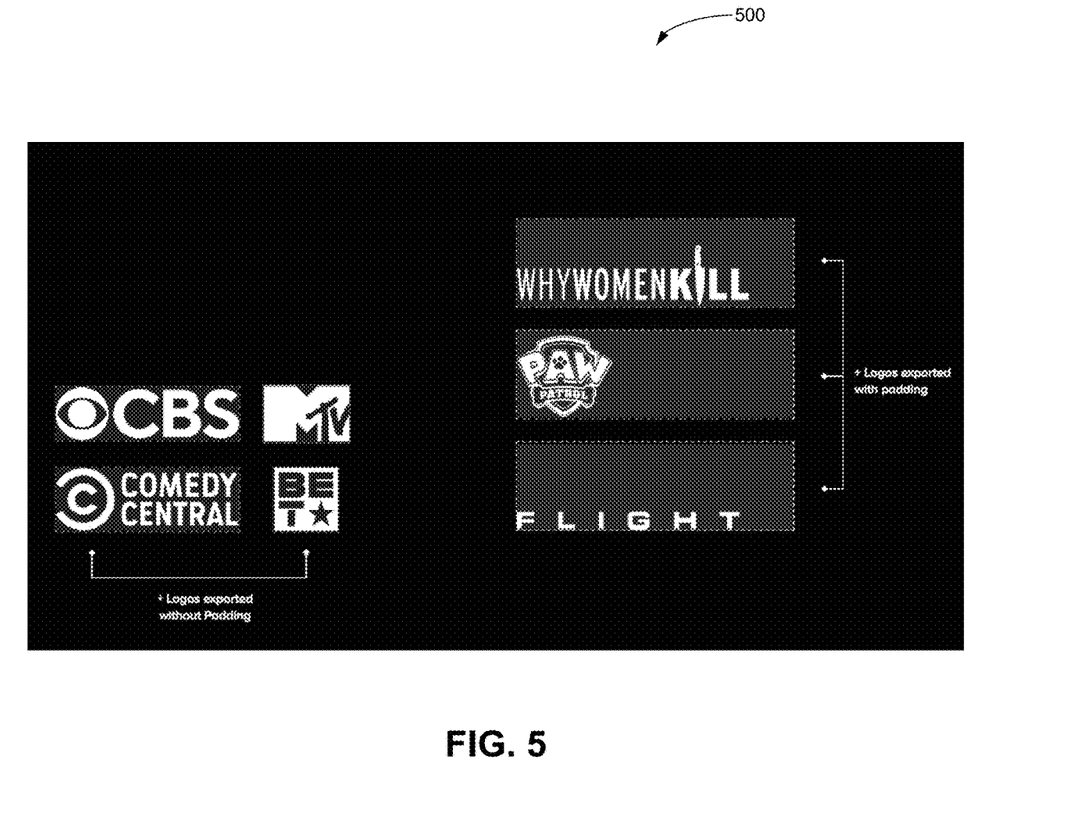
FIG. 5 illustrates a user interface where digital assets are displayed in a conventional manner.

FIG. 5 illustrates user interface 500 (annotated) in which digital assets were adjusted manually in conventional manners. The assets on the left were exported from original assets without any added padding. It can be seen that the assets, as displayed in user interface 500, are relatively of the same "weight" (i.e. prominence on the user interface) but do not line up well because their heights and widths are different. The assets at the right, were padded to have consistent widths and heights. However, the result are assets that, as displayed, have very different weight in the user interface and different amounts of surrounding blank space.

Figure 6:
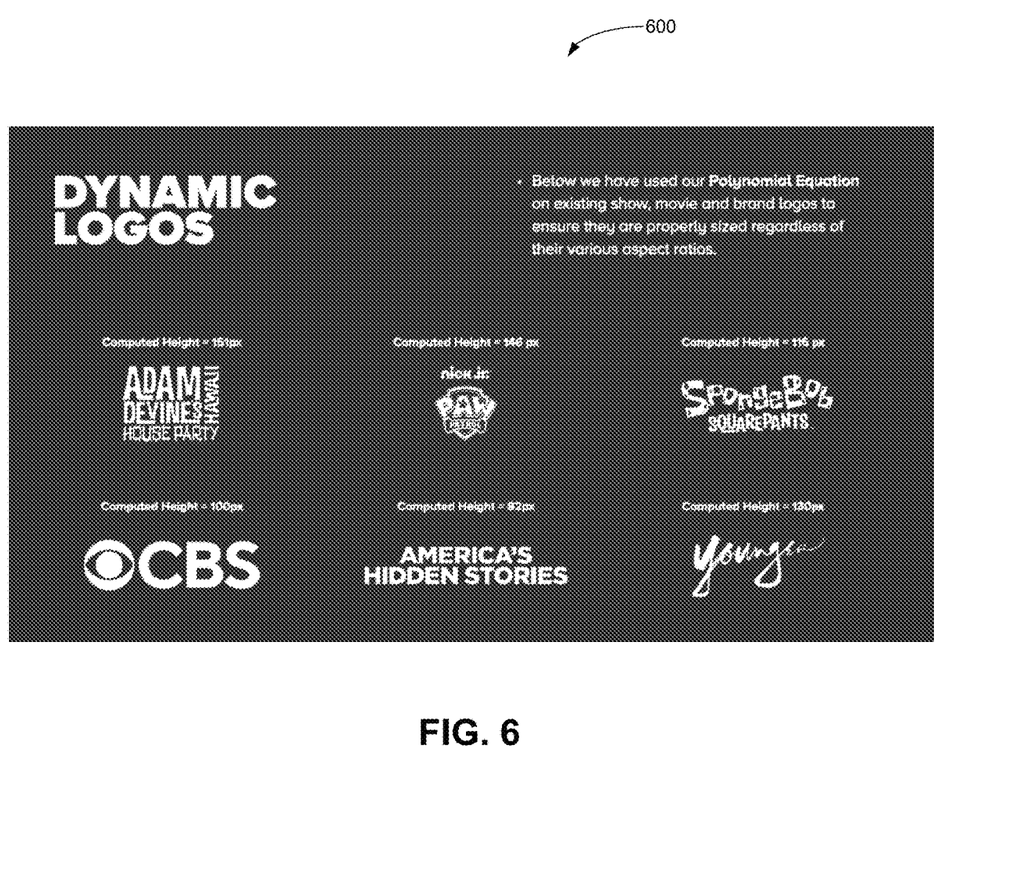
FIG. 6 illustrates a user interface where digital assets are displayed in accordance with disclosed implementations.

FIG. 6 illustrates a user interface (annotated) with digital assets, logos in this example, sized in accordance with disclosed embodiments. The logos have various aspect ratios but are properly sized to have consistent weight in the user interface. The data structures of the six logos displayed in user interface 600 are shown in FIG. 4 with the corresponding titles. Returning to FIG. 4, it can be seen that, for example, the height of the log for America Hidden Stories has been reduced from 121 to 82 in order to correspond in weight to the other logos in user interface 600 of FIG. 6.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended Claims. For example, it is to be understood that the present technology contemplates that, to the extent possible, one or more features of any implementation can be combined with one or more features of any other implementation.

What is claimed is:

1. A system configured for automatically sizing one or more digital assets in a display rendered on a computing device, the system comprising:
   one or more hardware processors configured by machine-readable instructions to:
   select examples of digital assets to be displayed;
   create a set of training data structures, wherein each training data structure includes an aspect ratio of each digital asset and a predetermined height or width corresponding to the aspect ratio for that digital asset;
   perform polynomial regression analysis on the set of training data structures to determine a best fitted trend line and a corresponding polynomial equation; and
   apply the polynomial equation to at least one specific digital asset data structure to be rendered on a display of a computing device to thereby automatically calculate a computed display height based on a width and aspect ratio specified in the specific digital asset data structure;
   store a modified digital asset data structure for the at least one specific digital asset data structure, the modified digital asset data structure including the computed display height; and
   cause the modified digital asset data structure to be rendered, with the computed display height, as a display of the digital asset on a computer display device.

2. The system of claim 1, wherein the display is a user interface, and the one or more digital assets are logos each corresponding to a selection of digital content.

3. The system of claim 1, wherein the applying step comprises plotting multiple sets of points, including aspect ratio points and corresponding height points, along a curve generated by the polynomial equation and determining a best fit of the at least one specific digital asset data structure with respect to the sets of points.

4. The system of claim 1, wherein there are multiple specific digital asset data structures and the resulting display includes multiple corresponding digital assets.

5. A method for automatically sizing one or more digital assets in a display rendered on a computing device, the method comprising:
   selecting examples of digital assets to be displayed;

creating a set of training data structures, wherein each training data structure includes an aspect ratio of each digital asset and a predetermined height or width corresponding to the aspect ratio for that digital asset;

performing polynomial regression analysis on the set of training data structures to determine a best fitted trend line and a corresponding polynomial equation;

applying the polynomial equation to at least one specific digital asset data structure to be rendered on a display of a computing device to thereby automatically calculate a computed display height based on a width and aspect ratio specified in the specific digital asset data structure;

storing a modified digital asset data structure for the at least one specific digital asset data structure, the modified digital asset data structure including the computed display height; and causing the modified digital asset data structure to be rendered, with the computed display height, as a display of the digital asset on a computer display device.

6. The method of claim 5, wherein the display is a user interface, and the one or more digital assets are logos each corresponding to a selection of digital content.

7. The method of claim 5, wherein applying the applying step comprises plotting multiple sets of points, including aspect ratio points and corresponding height points, along a curve generated by the polynomial equation and determining a best fit of the at least one specific digital asset data structure with respect to the sets of points.

8. The method of claim 5, wherein there are multiple specific digital asset data structures and the resulting display includes multiple corresponding digital assets.

9. A non-transient computer-readable storage medium having instructions embodied thereon, the instructions being executable by one or more processors to perform a method for automatically sizing one or more digital assets in a display rendered on a computing device, the method comprising:

selecting examples of digital assets to be displayed;

creating a set of training data structures, wherein each training data structure includes an aspect ratio of each digital asset and a predetermined height or width corresponding to the aspect ratio for that digital asset;

performing polynomial regression analysis on the set of training data structures to determine a best fitted trend line and a corresponding polynomial equation;

applying the polynomial equation to at least one specific digital asset data structure to be displayed to thereby automatically calculate a computed display height based on a width and aspect ratio specified in the specific digital asset data structure of the at least one specific digital asset as displayed;

storing a modified digital asset data structure for at least one specific digital asset, the modified digital asset data structure including the computed display height; and causing the modified digital asset data structure to be rendered, with the computed display height, as a display of the digital asset on a computer display device.

10. The computer-readable storage medium of claim 9, wherein the one or more digital assets are logos corresponding to digital content.

11. The computer-readable storage medium of claim 9, wherein applying the applying step comprises plotting multiple sets of points, including aspect ratio points and corresponding height points, along a curve generated by the polynomial equation and determining a best fit of the at least one specific digital asset data structure with respect to the sets of points.

12. The computer-readable storage medium of claim 9, wherein there are multiple specific digital asset data structures, and the resulting display includes multiple corresponding digital assets.

\* \* \* \* \*